(12) United States Patent
Splichal et al.

(10) Patent No.: US 9,898,392 B2
(45) Date of Patent: Feb. 20, 2018

(54) AUTOMATED TEST PLANNING USING TEST CASE RELEVANCY

(71) Applicant: Red Hat, Inc., Raleigh, NC (US)

(72) Inventors: Petr Splichal, Brno (CZ); Dalibor Pospisil, Kobylnice (CZ); Milos Malik, Rajec-Jestrebi (CZ); Karel Srot, Brno (CZ); Ales Zelinka, Brno (CZ); Petr Muller, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 40 days.

(21) Appl. No.: 15/055,864

(22) Filed: Feb. 29, 2016

(65) Prior Publication Data
US 2017/0249240 A1 Aug. 31, 2017

(51) Int. Cl.
G06F 9/44 (2006.01)
G06F 11/36 (2006.01)

(52) U.S. Cl.
CPC .............................. G06F 11/3672 (2013.01)

(58) Field of Classification Search
None
See application file for complete search history.

(56) References Cited

U.S. PATENT DOCUMENTS

| | | | | |
|---|---|---|---|---|
| 6,449,746 B1 * | 9/2002 | Truong | ............. | H03M 13/1515 714/784 |
| 6,978,216 B2 * | 12/2005 | Sweet | ................. | G06F 17/5022 324/762.02 |
| 8,381,197 B2 | 2/2013 | Meenakshi et al. | | |
| 8,473,913 B2 | 6/2013 | Nailer et al. | | |
| 8,745,589 B2 | 6/2014 | Arumugha et al. | | |
| 8,954,931 B2 | 2/2015 | Wefers et al. | | |
| 9,111,040 B2 | 8/2015 | Boden et al. | | |
| 2005/0166094 A1 * | 7/2005 | Blackwell | ........... | G06F 11/3664 714/38.14 |
| 2005/0223295 A1 * | 10/2005 | Hermes | ............... | G06F 11/3684 714/38.1 |
| 2006/0010426 A1 * | 1/2006 | Lewis | ................. | G06F 11/3684 717/124 |
| 2009/0300585 A1 * | 12/2009 | Meenakshisundaram | ........................... | G06F 11/3664 717/124 |
| 2010/0180260 A1 | 7/2010 | Chikkadevaiah et al. | | |

(Continued)

OTHER PUBLICATIONS

How-To Guide Test Automation Framework published Jan. 2011; Roland Remmers, Marcus Wefers, Mirco Rotzalawski (119 pages).

(Continued)

*Primary Examiner* — Chameli Das
(74) *Attorney, Agent, or Firm* — K&L Gates LLP

(57) ABSTRACT

A test automation tool detects a first set of parameters defining one or more software environments to be tested, where the first set of parameters includes at least a component to be tested. The test automation tool then identifies a general test plan, where the general test plan includes a first set of test cases, and where the first set of test cases are defined by the first set of parameters. The test automation tool detects a first set of test case relevancy rules for a first test case of the first set of test cases included in the general test plan. The test automation tool then creates an errata test plan based on the general test plan, where the errata test plan includes a second set of test cases.

20 Claims, 5 Drawing Sheets

(56) References Cited

U.S. PATENT DOCUMENTS

| | | | |
|---|---|---|---|
| 2010/0274520 A1* | 10/2010 | Ur ..................... | G06F 11/3676 702/123 |
| 2013/0036404 A1* | 2/2013 | Shu .................... | G06F 11/3676 717/127 |
| 2013/0104106 A1* | 4/2013 | Brown ................ | G06F 11/3696 717/124 |
| 2013/0185595 A1* | 7/2013 | D'Alterio ........... | G06F 11/3692 714/38.1 |
| 2014/0047278 A1* | 2/2014 | Sheye ................. | G06F 11/3684 714/38.1 |
| 2015/0242305 A1 | 8/2015 | Akbulut et al. | |
| 2016/0006629 A1* | 1/2016 | Ianakiev ............. | G06F 21/32 709/224 |

OTHER PUBLICATIONS

Emerging Trends in Software Test Plan Automation; Dr. Ravi Gorthi, Dr. Anjaneyulu Pasala, 2009 (79 pages).

Multiplex Configuration; Avocado 0.33.0 documentation, 2014 (12 pages).

Rational Quality Manager Test Case Execution Record video series; Dennis Schultz's Blog, Dec. 16, 2013 (3 pages).

* cited by examiner

US 9,898,392 B2

AUTOMATED TEST PLANNING USING TEST CASE RELEVANCY

BACKGROUND

The testing of software is a critical component of software engineering. Software testing provides important information about the quality of a product or service under investigation. The process of testing software can involve the creation of test plans related to an objective, the identification of appropriate test cases, and the application of these test cases to the software in interest to verify software performance and identify any anomalies or defects in the software. As new software products and versions are released, the complexity of testing the software and managing test plans and test cases also increases in kind.

SUMMARY

The present disclosure provides a new and innovative system, methods and apparatus for automated test planning using test case relevancy.

The system for automated test planning includes a memory and one or more processors in communication with the memory. A first test automation tool detects a first set of parameters defining one or more software environments to be tested, where the first set of parameters includes at least a component to be tested. Responsive to detecting the first set of parameters, the first test automation tool then identifies a general test plan, where the general test plan includes a first set of test cases, and where the first set of test cases are defined by the first set of parameters. Responsive to identifying the general test plan, the first test automation tool detects a first set of test case relevancy rules for a first test case of the first set of test cases included in the general test plan. The first test automation tool then creates an errata test plan based on the general test plan, where the errata test plan includes a second set of test cases, and where creating the errata test plan includes filtering at least the first test case of the first set of test cases by comparing the first set of parameters with a first rule of the first set of test case relevancy rules.

Additional features and advantages of the disclosed method and apparatus are described in, and will be apparent from, the following Detailed Description and the Figures.

DETAILED DESCRIPTION OF EXAMPLE EMBODIMENTS

Figure 1:
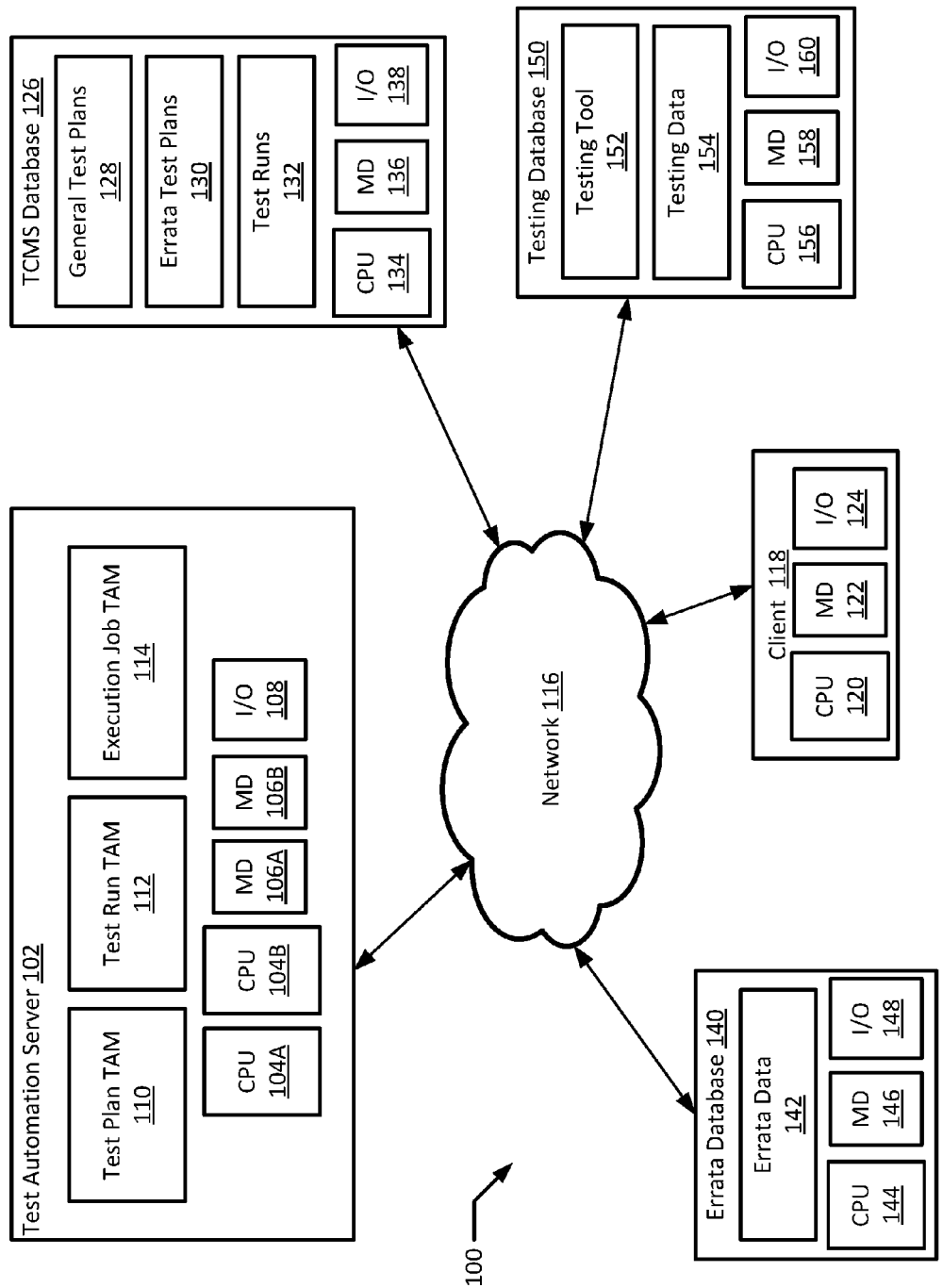
FIG. 1 is a block diagram of an example system for automated test planning using test case relevancy according to an example embodiment of the present disclosure.

FIG. 1 depicts a block diagram of an example system for automated test planning using test case relevancy according to an example embodiment of the present disclosure. The computer system 100 includes a test automation server 102, a test case management system (TCMS) database 126, an errata database 140, a testing database 150, one or more clients 118, and a network 116.

As testing software is a core aspect of developing software, streamlining this process provides the potential for reducing overhead in an organization as a whole. Given the complexity and number of test plans and test cases, it is also desirable to reduce the risk of oversight in identifying all the paths that need to be tested. Accordingly, improved methods and systems for automated test planning are desirable.

The present disclosure generally provides systems, methods, and computer readable media for improving the manner in which test plans and test cases are managed as part of testing various software components. Given the complexity and number of potential tests that might be applicable to any given software product, the present disclosure advantageously permits the efficient maintenance of test case metadata while ensuring that all relevant tests are executed. Moreover, the risk of unnecessary duplication of test data and/or test code is reduced by centralizing the maintenance of certain test data. For example, instead of maintaining multiple copies of the same test case for multiple software environments or software components, a single test case may be contained in one or more general test plans which are used to generate an errata test plan specific for given software environment. Then, for example, based on a generated (or selected) errata test plan, appropriate test runs are created and appropriate tests are executed within the test automation framework.

In this manner, the present disclosure facilitates efficient sharing of test coverage across different software environments and software components. For example, test plans, test cases, test runs, execution jobs, and test code may be shared across multiple software environments and software components. In the present disclosure, the steps performed may be fully automated while minimizing manual human interaction/intervention. For example, automated test planning is made possible based on general test plans. By maintaining test data in centralized locations and automating test planning, the system of the present disclosure further facilitates efficiently detecting similar issues, concerns, and problems for different software environments and software components. Furthermore, the test case filtering processes described may be cascaded such that they become more fine-grained as software environment metadata and rules become more specific.

In an example embodiment, each test automation server 102, test case management system (TCMS) database 126, errata database 140, testing database 150, and client 118 may in turn include one or more physical processors (e.g., CPU 104A-B, CPU 120, CPU 134, CPU 144, and CPU 156) communicatively coupled to respective memory devices (e.g., MD 106A-B, MD 122, MD 136, MD 146, and MD 158) and input/output devices (e.g., I/O 108, I/O 124, I/O 138, I/O 148, and I/O 160).

As used herein, the CPU (otherwise referred to as a processor) (e.g., CPU 104A-B, CPU 120, CPU 134, CPU 144, and/or CPU 156) refers to a device capable of executing instructions encoding arithmetic, logical, and/or I/O operations. In one illustrative example, a processor may follow Von Neumann architectural model and may include an arithmetic logic unit (ALU), a control unit, a plurality of registers, a CPU cache, and a memory controller. In a further aspect, a processor may be a single core processor or a multi-core processor. In another aspect, a processor may be implemented as a single integrated circuit, two or more integrated circuits, or may be a component of a multi-chip module (e.g., in which individual microprocessor dies are included in a single integrated circuit package and hence share a single socket).

As discussed herein, a memory device (e.g., MD 106A-B, MD 122, MD 136, MD 146, and/or MD 158) refers to a volatile or non-volatile memory device, such as RAM, ROM, EEPROM, or any other device capable of storing data. As discussed herein, I/O device (e.g., I/O 108, I/O 124, I/O 138, I/O 148, and/or I/O 160) refers to a device capable of providing an interface between one or more processor pins and an external device capable of inputting and/or outputting binary data.

Processors (e.g., CPU 104A-B, CPU 120, CPU 134, CPU 144, and/or CPU 156) may be interconnected using a variety of techniques, ranging from a point-to-point processor interconnect, to a system area network, such as an Ethernet-based network. Local connections within each test automation server 102, test case management system (TCMS) database 126, errata database 140, testing database 150, and client 118, including, for example, the connections between processors 104A-B and memory 106A-B and between processors 104A-B and I/O device 108 may be provided by one or more local buses of suitable architecture, for example, peripheral component interconnect (PCI).

In an example embodiment, the test automation server 102, test case management system (TCMS) database 126, errata database 140, testing database 150, and client 118 may communicate amongst one another via a network 116. For example, the network 116 may be a public network (e.g., the Internet), a private network (e.g., a local area network (LAN) or wide area network (WAN)), or a combination thereof. In an example embodiment, any one or more of the test automation server 102, test case management system (TCMS) database 126, errata database 140, testing database 150, and client 118 may reside on a single device. In an example embodiment, software modules of the test automation server 102, test case management system (TCMS) database 126, errata database 140, testing database 150, and/or client 118 may reside in a different device than the one illustrated or may be further combined or separated in to different devices. For example, the test plan test automation module (TAM) 110, the test run TAM 112, and the execution job TAM 114 may reside on the client 118 and communicate with the test case management system (TCMS) database 126, errata database 140, and testing database 150 over network 116.

In an example embodiment, a client 118 may be a personal computing device, server, etc. In another example embodiment, a client 118 may be a virtual machine or program executing on a personal computing device, server, one or more physical processors, etc. In an example embodiment, a user or testing professional communicates with the test automation server 102, test case management system (TCMS) database 126, errata database 140, and testing database 150 via the client 118.

In an example embodiment, the test automation server 102 includes a test plan TAM 110, a test run TAM 112, and an execution job TAM 114. The test plan TAM 110, test run TAM 112, and execution job TAM 114 are described in greater detail below with respect to FIGS. 2-5. In an example embodiment, the TCMS database 126 stores one or more general test plans 128, errata test plans 130, and test runs 132. In an example embodiment, the general test plans 128, errata test plans 130, and test runs 132 are stored as objects in the TCMS database 126. In an example embodiment, a user may provide additional general test plans 128, errata test plans 130, and test runs 132 to the TCMS database 126 to be stored. General test plans 128, errata test plans 130, and test runs 132 are described in greater detail below with respect to FIGS. 2-5. In an example embodiment, the errata database 140 stores errata data 142. Errata data 142 is described in greater detail below with respect to FIGS. 2-5. In an example embodiment, the testing database 150 includes a testing tool 152 and testing data 154. The testing tool 152 and testing data 154 are described in greater detail below with respect to FIGS. 2-5.

Figure 2:
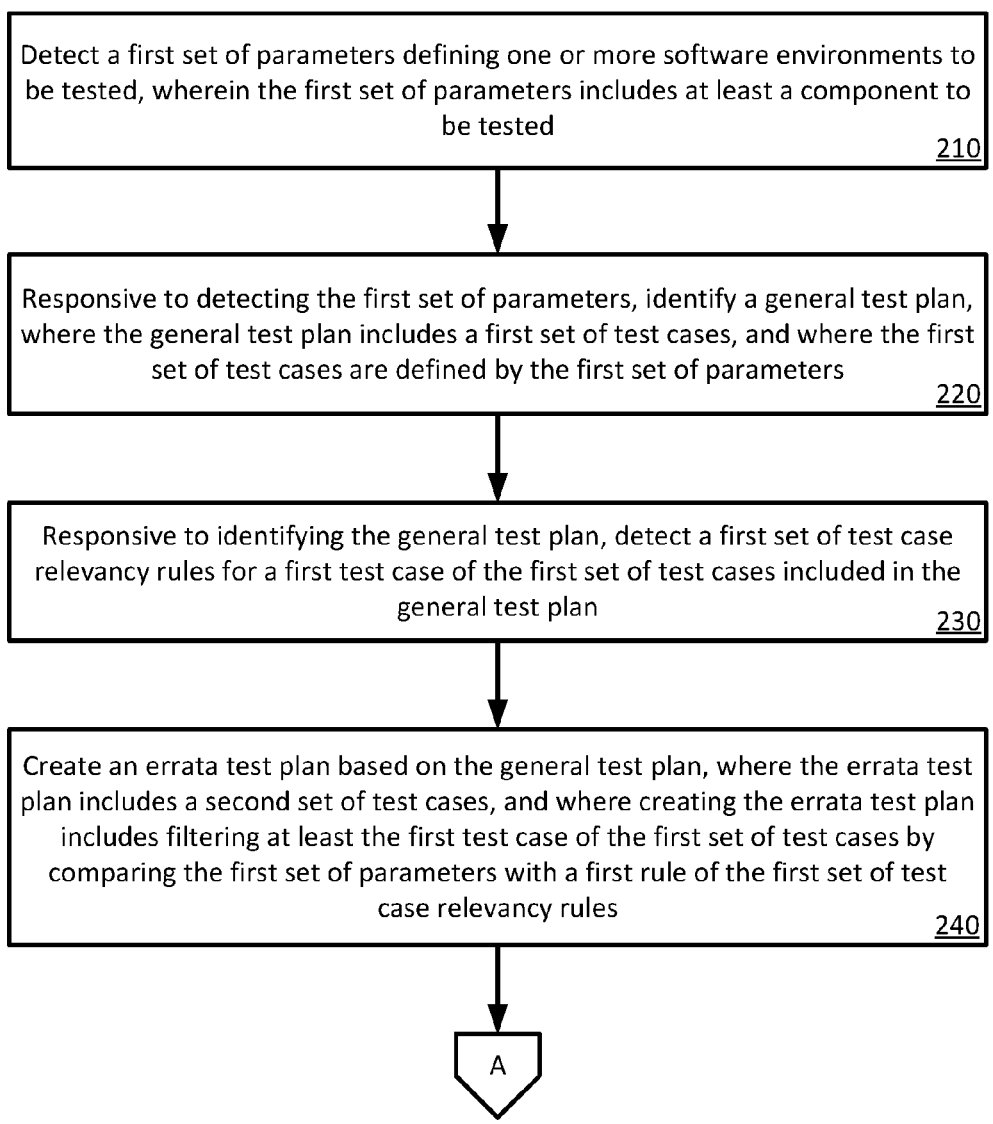
FIG. 2 is a flowchart illustrating an example process for automated test planning using test case relevancy according to an example embodiment of the present disclosure.

FIG. 2 illustrates a flowchart of an example method 200 for automated test planning using test case relevancy in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example embodiment, the method 200 is performed by the test plan TAM 110.

The example method 200 starts and a first test automation tool (test plan TAM 110) detects a first set of parameters defining one or more software environments to be tested, where the first set of parameters includes at least a component to be tested (block 210). As used herein, parameters may also be referred to as metadata. Example parameters that define a software environment may include one or more product names (e.g., RHEL, RHEL-5, RHEL-5.6, RHDTS, RHSCL, etc.), one or more distributions (otherwise referred to herein as the product version or the distro) (e.g., RHEL-6, RHEL-6.3, RHSCL-1.0.0-f-15, etc.), one or more distribution variants (otherwise referred to herein as the variant) (e.g., AS, ES, WS, Client, Compute Node, Desktop, Server, Workstation, etc.), one or more processor architectures (otherwise referred to herein as the architecture) (e.g., i386, ia64, ppc64, s390, s390x, x86_64, etc.), one or more software collections (otherwise referred to herein as the collection) (e.g., python27, python33, perl516, etc.), and one or more components to be tested (otherwise referred to herein as the component) (e.g., php, apache, etc.). In an example embodiment, the first set of parameters consists of only the component to be tested. In an example embodiment, the first set of parameters identifies multiple components to be tested. In an example embodiment, the first set of parameters may further include additional parameters such as one or more software collections and/or one or more product names.

Responsive to detecting the first set of parameters, the first test automation tool (test plan TAM 110) identifies a general test plan 128, where the general test plan 128 includes a first set of test cases, and where the first set of test cases are defined by the first set of parameters (block 220). In an example embodiment, a general test plan 128 is identified by querying the TCMS database 126 for a general test plan 128 defined by the first set of parameters (e.g., the component to be tested). In an example embodiment, the parameters corresponding to a general test plan 128 may include the name of the general test plan 128, the type of the general test plan 128, the product name(s) covered by the general test plan 128, the software collection(s) covered by the general test plan 128, and/or the components covered by the general test plan 128. In an example embodiment, one or more of these parameters corresponding to a general test plan 128 may be unspecified. In an example embodiment, a general test plan 128 contains a list of all test cases relevant to a component to be tested. In an example embodiment, a general test plan 128 is a parent test plan for a set of errata test plans 130. In an example embodiment, there is only one general test plan 128 for each component (including software collection(s) and dual components). In an example embodiment, a single general test plan may cover multiple components (for example, where it makes sense to test the components together). For example, all relevant components across multiple software releases may be linked together by a general test plan 128.

Responsive to identifying a general test plan 128, the first test automation tool (test plan TAM 110) detects a first set of test case relevancy rules for a first test case of the first set of test cases included in the general test plan 128 (block 230). In an example embodiment, test case relevancy rules identify software environment parameters that are applicable to a particular test case and/or software environment parameters that are inapplicable to the particular test case. In an example embodiment, each test case has its own set of test case relevancy rules attached to it as metadata. For example, the first set of test case relevancy rules for the first test case may indicate that the first test case is only relevant/applicable to product versions that are later than RHEL-6. In another example embodiment, the first set of test case relevancy rules for a first test case may indicate that the first test case is not relevant/applicable to a software environment characterized by both processor architecture s390x and product version RHEL-6.

In addition to using test case relevancy rules to filter only those test cases relevant for given software environment (or applicable to specific software environment parameters) it is also possible to parametrize test execution based on a combination of software environment parameters. In this manner, it is possible to handle special cases for given environments. In an example embodiment, test case relevancy rules for a particular test case may further identify the permissible tests that should be run for the particular test case. In an example embodiment, test case relevancy rules for a particular test case may further identify the impermissible tests that cannot be run for the particular test case. For example, the first set of test case relevancy rules for the first test case may indicate that the first test case is relevant/applicable to the processor architecture ia64 but that only specific tests of the first test case should be run on the ia64 processor architecture.

The first test automation tool (test plan TAM 110) may then create an errata test plan 130 based on the general test plan 128, where the errata test plan 130 includes a second set of test cases, and where creating the errata test plan 130 includes filtering at least the first test case of the first set of test cases by comparing the first set of parameters with a first rule of the first set of test case relevancy rules (block 240).

In an example embodiment, creating the errata test plan 130 may involve selecting an errata test plan 130 from a set of errata test plans in the TCMS database 126. For example, an errata test plan 130 may be selected by querying the TCMS database 126 for an errata test plan 130 defined by the second set of parameters. In an example embodiment, creating the errata test plan 130 may involve generating a new errata test plan 130 by defining the parameters of the errata test plan 130 and/or identifying a set of one or more test cases to include in the errata test plan 130.

In an example embodiment, the parameters corresponding to the errata test plan 130 may include the name of the errata test plan 130, an identification of the general test plan 128 that is the parent of the errata test plan 130, the product name(s) covered by the errata test plan 130, the software collection(s) covered by the errata test plan 130, the component(s) covered by the errata test plan 130, an errata identifier, and/or the product version(s) covered by the errata test plan 130. In an example embodiment, one or more of these parameters corresponding to an errata test plan 130 may be unspecified. In an example embodiment, an errata test plan 130 may be created for each erratum from the general test plan 128. In an example embodiment, an errata test plan 130 may apply to only a single product version. In an example embodiment, an errata test plan 130 may apply to multiple product versions.

In an example embodiment, an errata test plan 130 contains a subset of test cases (i.e. the same or fewer test cases) of the general test plan 128. For example, there may be 200 test cases in the general test plan 128 and 100 of those may be included in the errata test plan 130 after the filtering step. In an example embodiment, filtering at least the first test case of the first set of test cases includes at least one of (a) including the first test case in the second set of test cases included in the errata test plan 130 and (b) excluding the first test case from the second set of test cases included in the errata test plan 130. In an example embodiment, this filtering step is performed for each test case of the first set of test cases of the general test plan 128 to select the second set of test cases to be included in the errata test plan 130.

In an example embodiment, comparing the first set of parameters with a first rule of the first set of test case relevancy rules further includes applying at least the first rule of the first set of test case relevancy rules to the first set of parameters (defining the software environment to be tested). For example, the first set of test case relevancy rules may include the rule that the first test case is not relevant/applicable to RHSCL products. This rule may then be applied to the one or more software environments to be tested by comparing the rule against the product name parameter(s) of one or more software environments such that if a first software environment is an RHEL product, the first test case will be included in the second set of test cases of the errata test plan 130, but if the first software environment is an RHSCL product, the first test case will be excluded from the second set of test cases of the errata test plan 130.

In an example embodiment, every rule of the first set of test case relevancy rules is applied to the first set of parameters in determining whether the first test case should be filtered into (i.e. included in) the second set of test cases of the errata test plan 130 or whether the first test case should be filtered out of (i.e. excluded from) the second set of test cases of the errata test plan 130. In an example embodiment, the test case relevancy rules for each test case in the first set of test cases are applied and compared against the first set of parameters of the one or more software environments to be tested to determine whether each test case in the first set of test cases should either included in or excluded from the second set of test cases of the errata test plan 130. In an example embodiment, if no test case relevancy rule (for a particular test case) exists for a particular software environment parameter, the particular test case is by default relevant/applicable to that particular software environment parameter.

In this manner, the relevant software environment can be defined while keeping unexplored test case combinations intact. Furthermore, the application of the test case relevancy rules as described in the present disclosure facilitates strategically opting out of certain tests.

Figure 3:
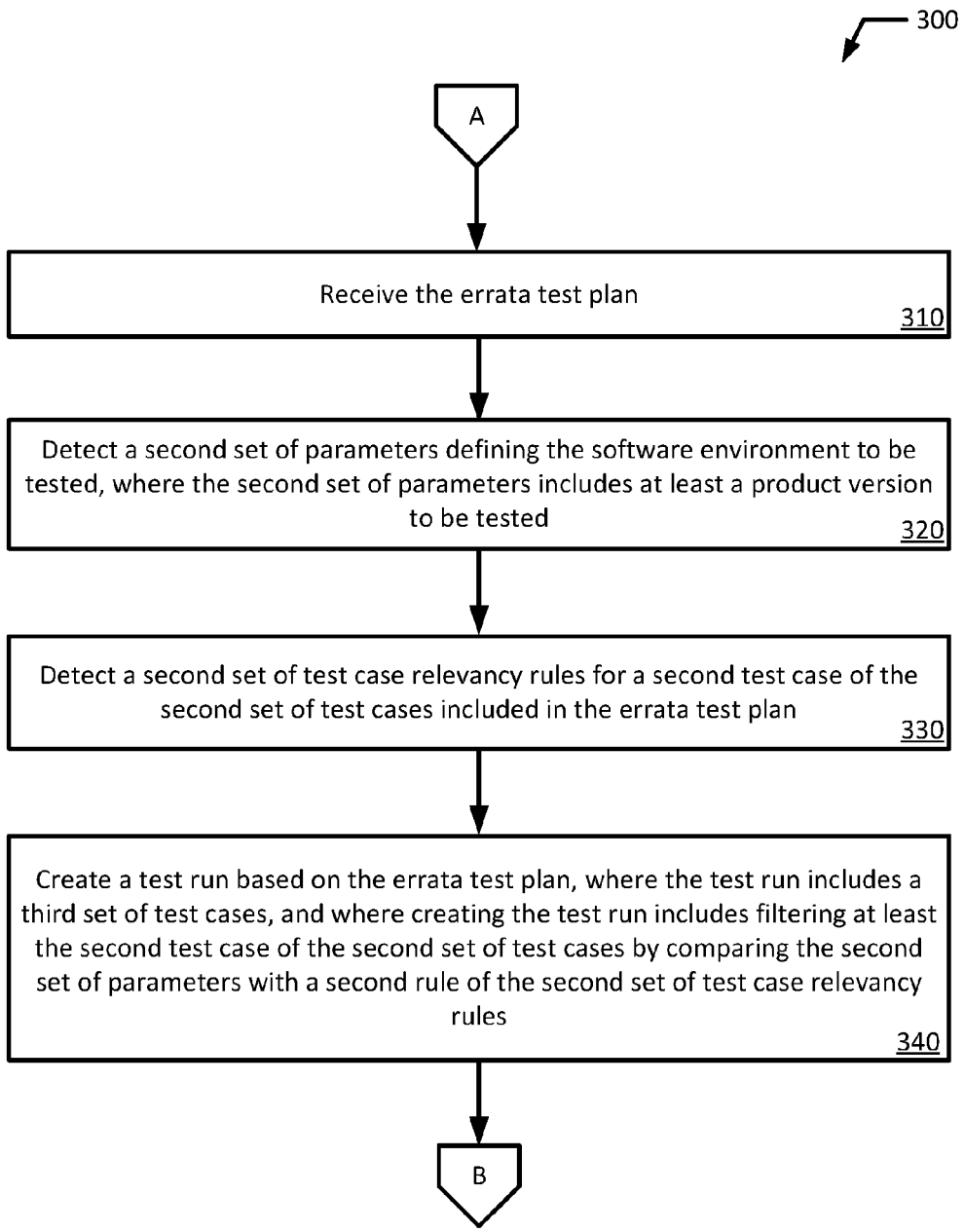
FIG. 3 is a flowchart continuing the example process illustrated in FIG. 2.

FIG. 3 illustrates a flowchart of an example method 300 for automated test planning using test case relevancy in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example embodiment, the method 300 is performed by the test run TAM 112.

As illustrated in FIG. 3, the example method 300 continues from the example method 200. A second test automation tool (test run TAM 112) receives the errata test plan 130 (block 310). In an example embodiment, the second test automation tool (test run TAM 112) receives the errata test plan 130 from the TCMS database 126. The second test automation tool (test run TAM 112) then detects a second set of parameters defining the software environment to be tested, where the second set of parameters includes at least a product version to be tested (block 320). In an example embodiment, the second set of parameters consists of only one product version to be tested. In an example embodiment, the second set of parameters identifies multiple product versions to be tested. In an example embodiment, the second set of parameters may further include additional parameters such as one or more components, one or more software collections, one or more product names, and/or one or more errata identifiers. In an example embodiment, the second set of parameters is the same as the first set of parameters.

The second test automation tool (test run TAM 112) then detects a second set of test case relevancy rules for a second test case of the second set of test cases included in the errata test plan 130 (block 330). In an example embodiment, the second test case is the same as the first test case and the second set of test case relevancy rules is the same as the first set of test case relevancy rules. In an example embodiment, the second test case is different from the first test case and the second set of test case relevancy rules is different from the first set of test case relevancy rules.

The second test automation tool (test run TAM 112) then creates a test run 132 based on the errata test plan 130, where the test run 132 includes a third set of test cases, and where creating the test run 132 includes filtering at least the second test case of the second set of test cases by comparing the second set of parameters with a second rule of the second set of test case relevancy rules (block 340). In an example embodiment, a software environment may have one or more errata build parameters. In an example embodiment, an errata build is defined by a srpm (source code file)—to—distribution pair. In an example embodiment, a test run 132 may be created for each errata build of the software environment. As such, multiple test runs 132 may be created.

In an example embodiment, creating the test run 132 may involve selecting a test run 132 from a set of test runs 132 in the TCMS database 126. For example, a test run 132 may be selected by querying the TCMS database 126 for a test run 132 defined by the third set of parameters. In an example embodiment, creating the test run 132 may involve generating a new test run 132 by defining the parameters of the test run 132 and/or identifying a set of one or more test cases to include in the test run 132.

In an example embodiment, the parameters corresponding to a test run 132 may include the name of the test run 132, the product name(s) covered by the test run 132, the software collection(s) covered by the test run 132, the component(s) covered by the test run 132, an errata identifier, the product version(s) covered by the test run 132, and/or the errata build(s) covered by the test run 132. In an example embodiment, one or more of these parameters corresponding to a test run 132 may be unspecified. In an example embodiment, a test run 132 may be created for each errata build (srpm-distro pair) by the second test automation tool (test run TAM 112). In an example embodiment, each test run 132 may apply to only a single errata build (srpm-distro pair). In an example embodiment, each test run 132 may apply to multiple errata builds (srpm-distro pairs).

In an example embodiment, the test run 132 contains a subset of test cases (i.e. the same or fewer test cases) of the errata test plan 130. For example, there may be 100 test cases in the errata test plan 130 and 50 of those may be included in the test run 132 after the filtering step. In an example embodiment, filtering at least the second test case of the second set of test cases includes at least one of (a) including the second test case in the third set of test cases included in the test run 132 and (b) excluding the second test case from the third set of test cases included in the test run 132. In an example embodiment, this filtering step is performed for each test case of the second set of test cases of the errata test plan 130 to select the third set of test cases to be included in the test run 132.

In an example embodiment, comparing the second set of parameters with a second rule of the second set of test case relevancy rules further includes applying at least the second rule of the second set of test case relevancy rules to the second set of parameters (defining the software environment to be tested). For example, the second set of test case relevancy rules may include the rule that the second test case is only relevant/applicable to product versions as recent or more recent than RHEL-7. This rule may then be applied to the one or more software environments to be tested by comparing the rule against the product version parameter(s) of one or more software environments such that, for example, if a first software environment includes both the RHEL-6 product version and the RHEL-7 product version, a test run 132 will be created for each of RHEL-6 and RHEL-7 and the second test case will only be included in the test run 132 that was created for the RHEL-7 product version.

In an example embodiment, every rule of the second set of test case relevancy rules is applied to the second set of parameters in determining whether the second test case should be filtered into (i.e. included in) the third set of test cases of the test run 132 or whether the second test case should be filtered out of (i.e. excluded from) the third set of test cases of the test run 132. In an example embodiment, the test case relevancy rules for each test case in the second set of test cases are applied and compared against the second set of parameters of the one or more software environments to be tested to determine whether each test case in the second set of test cases should either included in or excluded from the third set of test cases of the test run 132. In an example embodiment, if no test case relevancy rule (for a particular test case) exists for a particular software environment parameter, the particular test case is by default relevant/applicable to that particular software environment parameter.

In an example embodiment, a comparison of product versions operates in two modes: a major mode and a minor mode. In an example embodiment, in the major mode comparison, only the major version of the product version is compared against the test case relevancy rule corresponding to that parameter. For example, the application of a rule that says that a test case is only relevant/applicable to product versions older than RHEL-6, will only consider major versions of the distribution such as RHEL-3, RHEL-4, and RHEL-5. In an example embodiment, in the minor mode comparison, the minor version of the product version is compared against the test case relevancy rule corresponding to that parameter. For example, the application of a rule that says that a test case is only relevant/applicable to product versions older than RHEL-6.3 are relevant, will consider minor versions of the distribution such as RHEL-6 2, RHEL-6.1, and RHEL-6.0.

Figure 4:
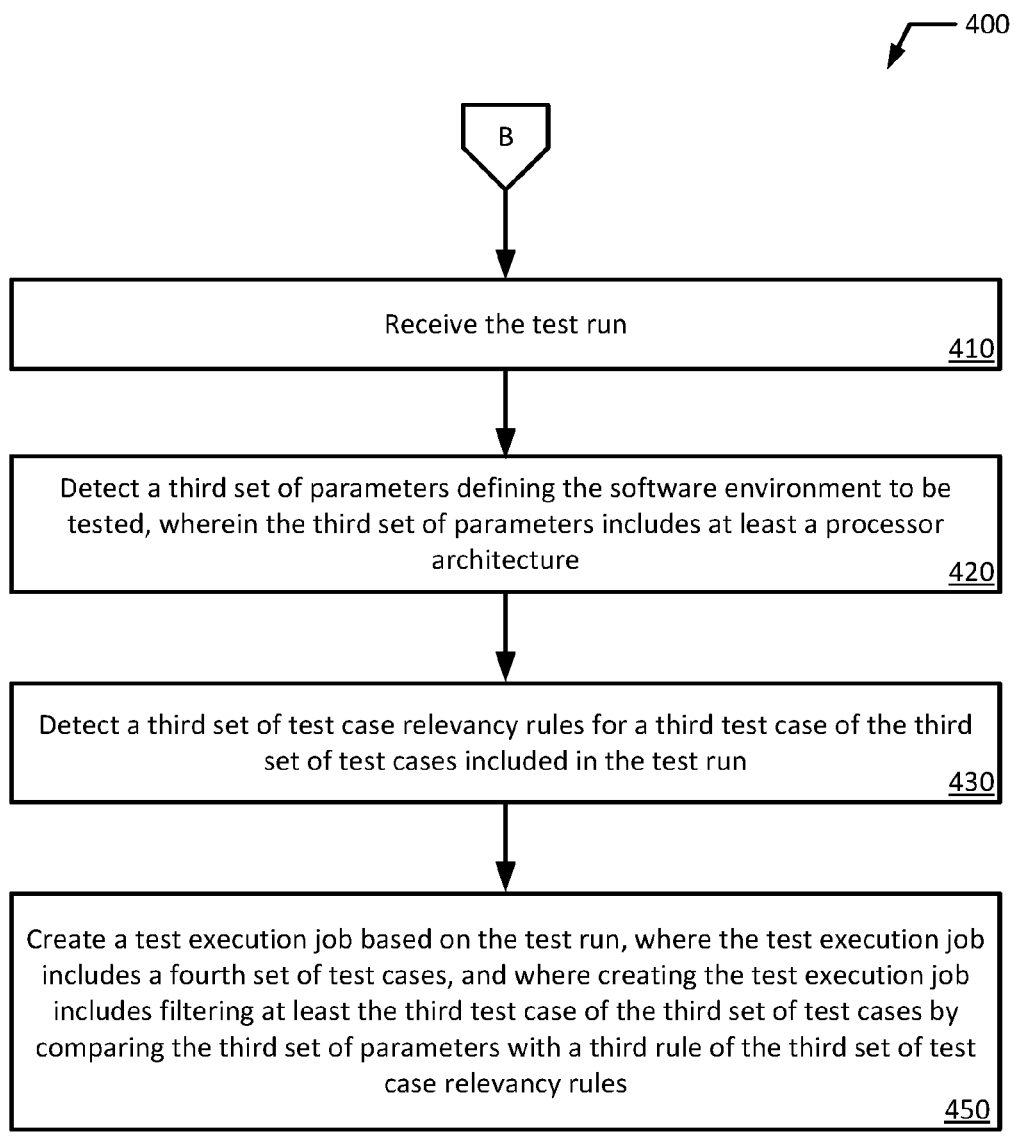
FIG. 4 is a flowchart continuing the example process illustrated in FIGS. 2 and 3.

FIG. 4 illustrates a flowchart of an example method 400 for automated test planning using test case relevancy in accordance with an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example embodiment, the method 400 is performed by the execution job TAM 114.

As illustrated in FIG. 4, the example method 400 continues from the example method 300. A third test automation tool (execution job TAM 114) receives the test run 132 (block 410). In an example embodiment, the third test automation tool (execution job TAM 114) receives the test run 132 from the TCMS database 126.

The third test automation tool (execution job TAM 114) detects a third set of parameters defining the software environment to be tested, where the third set of parameters includes at least a processor architecture (block 420). In an example embodiment, the third set of parameters identifies only one processor architecture to be tested. In an example embodiment, the third set of parameters identifies multiple processor architectures to be tested. In an example embodiment, the third set of parameters identifies only one product variant to be tested. In an example embodiment, the third set of parameters identifies multiple product variants to be tested. In an example embodiment, the third set of parameters may further include additional parameters such as one or more components, one or more software collections, one or more product names, and/or one or more errata identifiers.

The third test automation tool (execution job TAM 114) detects a third set of test case relevancy rules for a third test case of the third set of test cases included in the test run 132 (block 430). In an example embodiment, the third test case is the same as the first test case and the third set of test case relevancy rules is the same as the first set of test case relevancy rules. In an example embodiment, the third test case is different from the first test case and the third set of test case relevancy rules is different from the first set of test case relevancy rules. In an example embodiment, the third test case is different from the second test case and the third set of test case relevancy rules is different from the second set of test case relevancy rules. In an example embodiment, the third test case is different from both the first and second test cases and the third set of test case relevancy rules is different from both the first and second set of test case relevancy rules.

The third test automation tool (execution job TAM 114) creates a test execution job based on the test run 132, where the test execution job includes a fourth set of test cases, and where creating the test execution job includes filtering at least the third test case of the third set of test cases by comparing the third set of parameters with a third rule of the third set of test case relevancy rules (block 440). In an example embodiment, a test execution job is created for each test run 132. As such multiple test execution jobs may be created.

In an example embodiment, creating the test execution job may involve a test execution job stored in the testing database 150. For example, a test execution job may be selected by querying the testing database 150 for a test execution job defined by the fourth set of parameters. In an example embodiment, creating the test execution job may involve generating a new test execution job by defining the parameters of the test execution job and/or identifying a set of one or more test cases to include in the test execution job.

In an example embodiment, the parameters corresponding to a test execution job may include the name of the test execution job, the distribution name of the test execution job, a whiteboard, and/or an errata identifier. In an example embodiment, one or more of these parameters corresponding to a test execution job may be unspecified.

In an example embodiment, a test execution job may be created for each test run 132 by the third test automation tool (execution job TAM 114). In an example embodiment, each test execution job may apply to only a test run 132. In an example embodiment, each test execution job may apply to multiple test runs 132.

In an example embodiment, the test execution job contains a subset of test cases (i.e. the same or fewer test cases) of the test run 132. For example, there may be 50 test cases in the test run 132 and 25 of those may be included in the test execution job after the filtering step. In an example embodiment, filtering at least the third test case of the third set of test cases includes at least one of (a) including the third test case in the fourth set of test cases included in the test execution job and (b) excluding the third test case from the fourth set of test cases included in the test execution job. In an example embodiment, this filtering step is performed for each test case of the third set of test cases of the test run 132 to select the fourth set of test cases to be included in the test execution job.

In an example embodiment, comparing the third set of parameters with a third rule of the third set of test case relevancy rules further includes applying at least the third rule of the third set of test case relevancy rules to the third set of parameters (defining the software environment to be tested). For example, the third set of test case relevancy rules may include the rule that the third test case is only relevant/applicable to the x86_64 and i386 processor architectures. This rule may then be applied to the one or more software environments to be tested by comparing the rule against the product architecture parameter(s) of one or more software environments such that, for example, if a first software environment includes the i386, ia64, ppc64, s390, s390x, and x86_64 processor architectures, a test execution job will be created for each of the i386, ia64, ppc64, s390, s390x, and x86_64 processor architectures, and the second test case will only be included in the (two) test execution jobs that were created for the x86_64 and i386 processor architectures.

In an example embodiment, every rule of the third set of test case relevancy rules is applied to the third set of parameters in determining whether the third test case should be filtered into (i.e. included in) the fourth set of test cases of the test execution job or whether the third test case should be filtered out of (i.e. excluded from) the fourth set of test cases of the test execution job. In an example embodiment, the test case relevancy rules for each test case in the third set of test cases are applied and compared against the third set of parameters of the one or more software environments to be tested to determine whether each test case in the third set of test cases should either included in or excluded from the fourth set of test cases of the test execution job. In an example embodiment, if no test case relevancy rule (for a particular test case) exists for a particular software environment parameter, the particular test case is by default relevant/applicable to that particular software environment parameter.

Figure 5:
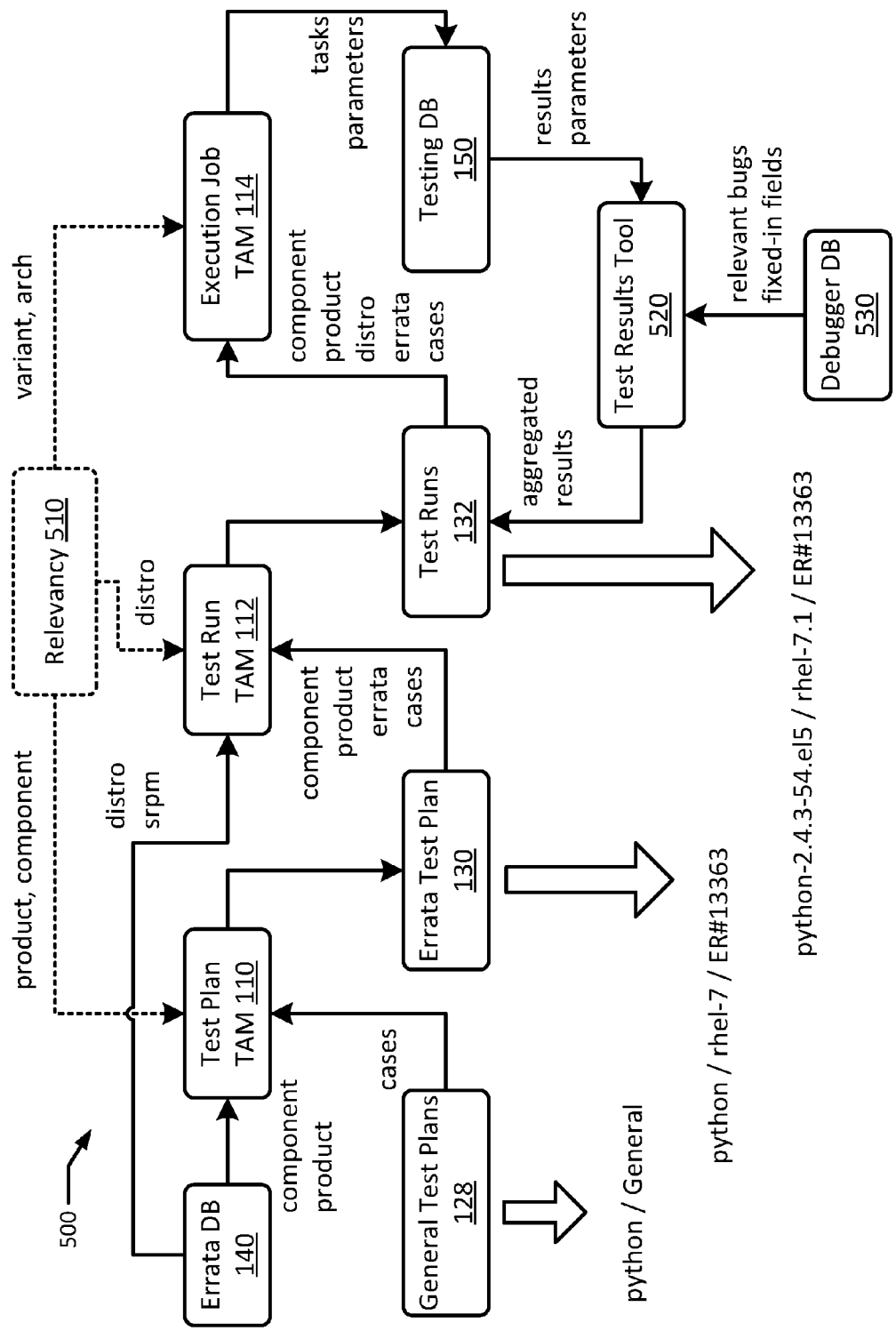
FIG. 5 is a flow diagram illustrating an example process for automated test planning using test case relevancy according to an example embodiment of the present disclosure.

FIG. 5 illustrates a flow diagram of an example method 500 for automated test planning using test case relevancy in accordance with an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

In the illustrated example embodiment, the test plan TAM 110 detects the component and product name parameters (first set of parameters) defining a software environment to be tested. This information is fetched from the errata database 140. For example, the test plan TAM 110 may detect that the python component is sought to be tested. The test plan TAM 110 then identifies and receives a general test plan 128, where the general test plan 128 includes a first set of test cases, and where the first set of test cases are defined by the component and product name parameters. The test plan TAM 110 receives the general test plan 128 from the TCMS database 126. For example, the general test plan may include test cases for the following two software environments characterized by the following parameters:

Environment One (ENV1)—product: rhscl; distro: rhel-6, rhel-7; arch: x86_64.

Environment Two (ENV2)—product: rhel; distro: rhel-6, rhel-7; arch: x86_64, i386, ppc64, s390x.

The test plan TAM 110 then detects a first set of test case relevancy rules for a first test case of the first set of test cases included in the general test plan 128. For example, the test plan TAM 110 may detect the rule that the first test case is not relevant/applicable to the RHSCL product. This relevancy 510 rule is applied to the set of parameters of the two software environments to create an errata test plan 130 based on the general test plan 128, where the errata test plan 130 includes a second set of test cases, and where creating the errata test plan 130 includes filtering at least the first test case of the first set of test cases by comparing the first set of parameters with a first rule of the first set of test case relevancy rules. For example, applying the rule that the first test case is not relevant/applicable to the RHSCL product name parameter would in this example exclude the first test case from the errata test plan 130 created for software ENV1 but would include the first test case in the errata test plan 130 created for software ENV2.

The test run TAM 112 receives the generated errata test plan 130 and the corresponding second set of test cases. Along with the generated errata test plan 130, test run TAM 112 receives the component(s), product name(s), and errata identifier parameters corresponding to the second set of test cases. The test run TAM 112 then detects the product version (distribution) and the srpm parameters (second set of parameters) defining the software environment to be tested. The second set of parameters is fetched from the errata database 140. The test run TAM 112 then detects a second set of test case relevancy rules for a second test case of the second set of test cases included in the errata test plan 130.

For example, the test plan TAM 110 may detect the rule that the second test case is not relevant/applicable to product versions older than RHEL-7. The test run TAM 112 then creates a test run 132 based on the errata test plan 130, where the test run 132 includes a third set of test cases, and where creating the test run 132 includes filtering at least the second test case of the second set of test cases by comparing the second set of parameters with a second rule of the second set of test case relevancy rules. In the example provided above, a test run is created for each product version (distro) in software ENV2, which includes a test run for RHEL-6 and a test run for RHEL-7. For example, applying the rule that the second test case is not relevant/applicable to product versions older than RHEL-7 would in this case include the second test case in the test run 132 created for RHEL-7 and exclude the second test case from the test run 132 created for RHEL-6

The execution job TAM 114 then receives the at least one test run and the corresponding third set of test cases included in the at least one test run. Along with the test run 132, the execution job TAM 114 receives the component(s), product name(s), product version(s), and errata identifier parameters corresponding to the third set of test cases. The execution job TAM 114 detects a product variant and a processor architecture (third set of parameters) defining the software environment to be tested.

The execution job TAM 114 then detects a third set of test case relevancy rules for a third test case of the third set of test cases included in the test run 132. For example, the execution job TAM 114 may detect the rule that the third test case is only relevant/applicable to the x86_64 and i386 processor architectures. The execution job TAM 114 then creates a test execution job based on the test run 132, where the test execution job includes a fourth set of test cases, and where creating the test execution job includes filtering at least the third test case of the third set of test cases by comparing the third set of parameters with a third rule of the third set of test case relevancy rules. In the example provided above, a test execution job is created for each processor architecture in software ENV2, which includes a test execution job for each of the x86_64, i386, ppc64, and s390x processor architectures. Furthermore, in the illustrated example embodiment, applying the rule that the third test case in only relevant/applicable to the x86_64 and i386 processor architectures would in this case include the third test case in the (two) test execution jobs created for the x86_64 and i386 processor architectures and exclude the third test case from the (two) test execution jobs for the i386 and ppc64 processor architectures.

The execution job TAM 114 can then schedule execution of at least one test execution job of the filtered set of test execution jobs. In an example embodiment, the tasks and parameters and the fourth set of test cases corresponding to the test execution job are provided to the testing database 150 which uses a testing tool 152 and testing data 154 to execute the applicable test cases. The testing database 150 then provides the results and parameters to a test results tool. The testing database 150 fetches an identification of the relevant bugs applicable to the test results and provides the aggregated results to be incorporated into test runs 132.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for automated test planning, comprising:
  a memory; and
  one or more processors, in communication with the memory to:
  detect, by a first test automation tool executing on the one or more processors, a first set of parameters defining one or more software environments to be tested, wherein the first set of parameters includes at least a component to be tested;
  responsive to detecting the first set of parameters, identify, by the first test automation tool, a general test plan, wherein the general test plan includes a first set of test cases, and wherein the first set of test cases are defined by the first set of parameters;
  responsive to identifying the general test plan, detect, by the first test automation tool, a first set of test case relevancy rules for a first test case of the first set of test cases included in the general test plan;
  create, by the first test automation tool, an errata test plan based on the general test plan, wherein the errata test plan includes a second set of test cases, and wherein creating the errata test plan includes filtering at least the first test case of the first set of test cases by comparing the first set of parameters with a first rule of the first set of test case relevancy rules;
  receive, by a second test automation tool executing on the one or more processors, the errata test plan;
  detect, by the second test automation tool, a second set of parameters defining the software environment to be tested, wherein the second set of parameters includes at least a product version to be tested;
  detect, by the second test automation tool, a second set of test case relevancy rules for a second test case of the second set of test cases included in the errata test plan;
  create, by the second test automation tool, a test run based on the errata test plan, wherein the test run includes a third set of test cases, and wherein creating the test run includes filtering at least the second test case of the second set of test cases by comparing the second set of parameters with a second rule of the second set of test case relevancy rules;
  receive, by a third test automation tool executing on the one or more processors, the test run;
  detect, by the third test automation tool, a third set of parameters defining the software environment to be tested, wherein the third set of parameters includes at least a processor architecture;
  detect, by the third test automation tool, a third set of test case relevancy rules for a third test case of the third set of test cases included in the test run; and
  create, by the third test automation tool, a test execution job based on the test run, wherein the test execution job includes a fourth set of test cases, and wherein creating the test execution job includes filtering at least the third test case of the third set of test cases by comparing the third set of parameters with a third rule of the third set of test case relevancy rules.

2. The system of claim 1, wherein the first set of parameters further includes a product name.

3. The system of claim 1, wherein the second set of parameters includes multiple product versions to be tested and the second test automation tool is further configured to create a test run for each of the multiple product versions to be tested.

4. The system of claim 1, wherein the third test automation tool executing on the one or more processors is further configured to schedule execution of the test execution job.

5. The system of claim 1, wherein the third set of parameters of the third set of test cases includes multiple processor architectures to be tested and the third test automation is further configured to create a test execution job for each of the multiple processor architectures to be tested.

6. The system of claim 1, wherein the processor architecture includes an arithmetic logic unit.

7. The system of claim 1, wherein the processor architecture includes a plurality of registers.

8. The system of claim 1, wherein the processor architecture includes a CPU cache.

9. The system of claim 1, wherein the processor architecture includes a memory controller.

10. The system of claim 1, where the processor architecture includes at least one of: a single core processor; a multi-core processor; a single integrated circuit; a plurality of integrated circuits; a component of a multi-chip module; and individual microprocessor dies included in a single integrated circuit package sharing a single socket.

11. A method for automated test planning, comprising:
  detecting, by a first test automation tool executing on one or more processors, a first set of parameters defining one or more software environments to be tested, wherein the first set of parameters includes at least a component to be tested;
  responsive to detecting the first set of parameters, identifying, by the first test automation tool, a general test plan, wherein the general test plan includes a first set of test cases, and wherein the first set of test cases are defined by the first set of parameters;
  responsive to identifying the general test plan, detecting, by the first test automation tool, a first set of test case relevancy rules for a first test case of the first set of test cases included in the general test plan;
  creating, by the first test automation tool, an errata test plan based on the general test plan, wherein the errata test plan includes a second set of test cases, and wherein creating the errata test plan includes filtering at least the first test case of the first set of test cases by comparing the first set of parameters with a first rule of the first set of test case relevancy rules;

receiving, by a second test automation tool executing on the one or more processors, the errata test plan;
detecting, by the second test automation tool, a second set of parameters defining the software environment to be tested, wherein the second set of parameters includes at least a product version to be tested;
detecting, by the second test automation tool, a second set of test case relevancy rules for a second test case of the second set of test cases included in the errata test plan;
creating, by the second test automation tool, a test run based on the errata test plan, wherein the test run includes a third set of test cases, and wherein creating the test run includes filtering at least the second test case of the second set of test cases by comparing the second set of parameters with a second rule of the second set of test case relevancy rules;
receiving, by a third test automation tool executing on the one or more processors, the test run;
detecting, by the third test automation tool, a third set of parameters defining the software environment to be tested, wherein the third set of parameters includes at least a processor architecture;
detecting, by the third test automation tool, a third set of test case relevancy rules for a third test case of the third set of test cases included in the test run; and
creating, by the third test automation tool, a test execution job based on the test run, wherein the test execution job includes a fourth set of test cases, and wherein creating the test execution job includes filtering at least the third test case of the third set of test cases by comparing the third set of parameters with a third rule of the third set of test case relevancy rules.

12. The method of claim 11, wherein the first set of parameters further includes a product name.

13. The method of claim 11, wherein the second set of parameters includes multiple product versions to be tested and the second test automation tool is further configured to create a test run for each of the multiple product versions to be tested.

14. The method of claim 11, wherein the third test automation tool executing on the one or more processors is further configured to schedule execution of the test execution job.

15. The method of claim 11, wherein the third set of parameters of the third set of test cases includes multiple processor architectures to be tested and the third test automation is further configured to create a test execution job for each of the multiple processor architectures to be tested.

16. A computer-readable non-transitory storage medium storing executable instructions for automated test planning, which when executed by a computer system, cause the computer system to:
detect, by a first test automation tool executing on the computer system, a first set of parameters defining one or more software environments to be tested, wherein the first set of parameters includes at least a component to be tested;
responsive to detecting the first set of parameters, identify, by the first test automation tool, a general test plan, wherein the general test plan includes a first set of test cases, and wherein the first set of test cases are defined by the first set of parameters;
responsive to identifying the general test plan, detect, by the first test automation tool, a first set of test case relevancy rules for a first test case of the first set of test cases included in the general test plan;
create, by the first test automation tool, an errata test plan based on the general test plan, wherein the errata test plan includes a second set of test cases, and wherein creating the errata test plan includes filtering at least the first test case of the first set of test cases by comparing the first set of parameters with a first rule of the first set of test case relevancy rules;
receive, by a second test automation tool executing on the computer system, the errata test plan;
detect, by the second test automation tool, a second set of parameters defining the software environment to be tested, wherein the second set of parameters includes at least a product version to be tested;
detect, by the second test automation tool, a second set of test case relevancy rules for a second test case of the second set of test cases included in the errata test plan;
create, by the second test automation tool, a test run based on the errata test plan, wherein the test run includes a third set of test cases, and wherein creating the test run includes filtering at least the second test case of the second set of test cases by comparing the second set of parameters with a second rule of the second set of test case relevancy rules;
receive, by a third test automation tool executing on the one or more processors, the test run;
detect, by the third test automation tool, a third set of parameters defining the software environment to be tested, wherein the third set of parameters includes at least a processor architecture;
detect, by the third test automation tool, a third set of test case relevancy rules for a third test case of the third set of test cases included in the test run; and
create, by the third test automation tool, a test execution job based on the test run, wherein the test execution job includes a fourth set of test cases, and wherein creating the test execution job includes filtering at least the third test case of the third set of test cases by comparing the third set of parameters with a third rule of the third set of test case relevancy rules.

17. The computer-readable non-transitory storage medium of claim 16, wherein the first set of parameters further includes a product name.

18. The computer-readable non-transitory storage medium of claim 16, wherein the second set of parameters includes multiple product versions to be tested and the second test automation tool is further configured to create a test run for each of the multiple product versions to be tested.

19. The computer-readable non-transitory storage medium of claim 16, wherein the third test automation tool executing on the one or more processors is further configured to schedule execution of the test execution job.

20. The computer-readable non-transitory storage medium of claim 16, wherein the third set of parameters of the third set of test cases includes multiple processor architectures to be tested and the third test automation is further configured to create a test execution job for each of the multiple processor architectures to be tested.

* * * * *